United States Patent
Jones et al.

(10) Patent No.: US 9,453,586 B2
(45) Date of Patent: Sep. 27, 2016

(54) VALVE ASSEMBLY

(71) Applicant: HYDROGARDEN WHOLESALE SUPPLIES LTD., Coventry (GB)

(72) Inventors: Richard Jones, Coventry (GB); Stephen Bryce Rusling, Worcestershire (GB)

(73) Assignee: Hydrogarden Wholesale Supplies Ltd., Binley Coventry (GB)

( * ) Notice: Subject to any disclaimer, the term of this patent is extended or adjusted under 35 U.S.C. 154(b) by 121 days.

(21) Appl. No.: 14/373,339

(22) PCT Filed: Jan. 21, 2013

(86) PCT No.: PCT/GB2013/000023
§ 371 (c)(1),
(2) Date: Jul. 18, 2014

(87) PCT Pub. No.: WO2013/108007
PCT Pub. Date: Jul. 25, 2013

(65) Prior Publication Data
US 2014/0352811 A1    Dec. 4, 2014

(30) Foreign Application Priority Data
Jan. 19, 2012  (GB) .................... 1200855.3

(51) Int. Cl.
| | |
|---|---|
| *F16K 31/18* | (2006.01) |
| *F16K 31/22* | (2006.01) |
| *F16K 31/28* | (2006.01) |
| *F16K 31/34* | (2006.01) |
| *F16K 21/18* | (2006.01) |
| *A01G 27/00* | (2006.01) |

(52) U.S. Cl.
CPC ............... *F16K 31/18* (2013.01); *A01G 27/00* (2013.01); *F16K 21/18* (2013.01); *F16K 31/22* (2013.01); *F16K 31/28* (2013.01); *F16K 31/34* (2013.01); *Y10T 137/7404* (2015.04)

(58) Field of Classification Search
CPC ........ F16K 31/18; F16K 31/34; F16K 31/28; F16K 31/22; F16K 21/18; A01G 27/00; Y10T 137/7404
USPC ......................................... 137/423
See application file for complete search history.

(56) References Cited

U.S. PATENT DOCUMENTS 5,445,143 A * 8/1995 Sims .................... A61M 16/162
128/203.26

(Continued)

FOREIGN PATENT DOCUMENTS

WO        9920100        4/1999

*Primary Examiner* — Kevin Murphy
*Assistant Examiner* — Daphne M Barry
(74) *Attorney, Agent, or Firm* — AEON Law; Adam L. K. Philipp

(57) ABSTRACT

A valve assembly (I) for controlling the supply of water to a reservoir. The assembly (I) has a main body (2) having a floor (4) and side walls (3), an upper float (15) pivotably mounted within the main body (2) and a lower float (21) pivotably mounted beneath the main body (2). The floor (4) of the main body (2) having an aperture. The upper float (15) is upwardly movable to a position to shut off the water supply to the reservoir; and the lower float (21) is movable upwardly to seal the aperture in the floor (4) of the main body (2) thereby to prevent water draining from the main body through said aperture or from prematurely filing.

7 Claims, 4 Drawing Sheets

(56) References Cited

U.S. PATENT DOCUMENTS 5,964,247 A * 10/1999 Johnson .................... B08B 9/00
 137/218
6,145,532 A * 11/2000 Tuckey ............ B60K 15/03519
 137/202
6,260,574 B1 * 7/2001 Nichols-Roy ............. E03D 1/32
 137/414
6,510,866 B2 * 1/2003 Li .............................. E03D 1/32
 137/2
7,661,438 B2 * 2/2010 Nichols-Roy ........... F16K 31/26
 137/411

* cited by examiner

VALVE ASSEMBLY

FIELD

The present invention relates to a valve. More especially the invention relates to a valve for use in the hydroponics industry for controlling the flow of water into a reservoir for subsequent absorption by plants and the like.

BACKGROUND

At the heart of hydroponics systems is the need to control the supply of water to plants in accordance with the plant's needs.

Traditionally, conventional ballcock-type float valves have been used for this purpose. Such valves however do not allow total reduction of the fluid level before refilling.

A valve developed by Autopot Systems marketed under the brand "Smart-Valve Mk2" was developed which allowed total reduction of the fluid level. This valve comprises a main body having a top float and a bottom float (as shown in FIG. 1). When connected to a water supply the valve opens to allow water to enter the bottom of the growing container to a pre-determined and pre-set depth (usually 35 mm)•The valve then closes and will permit no further water to enter the container until all the original supply has been conveyed from the water chamber to the pot and consequently to the plant. Once the water has been absorbed to the extent that the film of water under the valve has gone, the valve re-opens and another supply of water enters the growing container.

The Autopot valve works on the basis of a vacuum being formed within the chambers to close the valve thereby to cut-off the water supply.

The Applicants have found that the reliance on the formation of a vacuum prevents a consistent reduction of the water level.

The present invention seeks to provide an improved valve assembly that, amongst other benefits, does not rely on the formation of a vacuum to shut off supply.

STATEMENT OF INVENTION

According to a first aspect of the invention there is provided a valve assembly for controlling the supply of water to a reservoir, the assembly comprising a main body having a floor and side walls, an upper float located within the main body and pivotally connected thereto, and a lower float located beneath the main body and pivotally connected thereto, the floor of the main body having an aperture; wherein the upper float is upwardly movable to a position to shut off the water supply to the reservoir; and wherein the lower float is movable upwardly to seal the aperture in the floor of the main body thereby to prevent water draining from the main body through said aperture or from prematurely filing.

Preferably the main body comprises a inner section and a outer frame wherein the upper float is located within the inner section.

Preferably the outer frame includes an inlet connected to the outlet of the water source.

Preferably the upper float assembly comprises a main section and an elongate arm the distal end of which is connected to a transverse pivot bar. Preferably an end surface of the elongate arm includes a silicon plug which acts to seal the inlet when the elongate arm is pivotally raised relative to the main body.

Preferably the lower float comprises an elongate arm one end of which is formed as a paddle section and the other of which extends to a transverse arm which includes a pivot bar.

Preferably the main body at least one side or end of the main body is adjustable in height.

BRIEF DESCRIPTION OF THE DRAWINGS

One embodiment of the invention will now be described by way of example only, with reference to the accompanying figures in which.

DETAILED DESCRIPTION OF PREFERRED EMBODIMENTS

Figure 1:
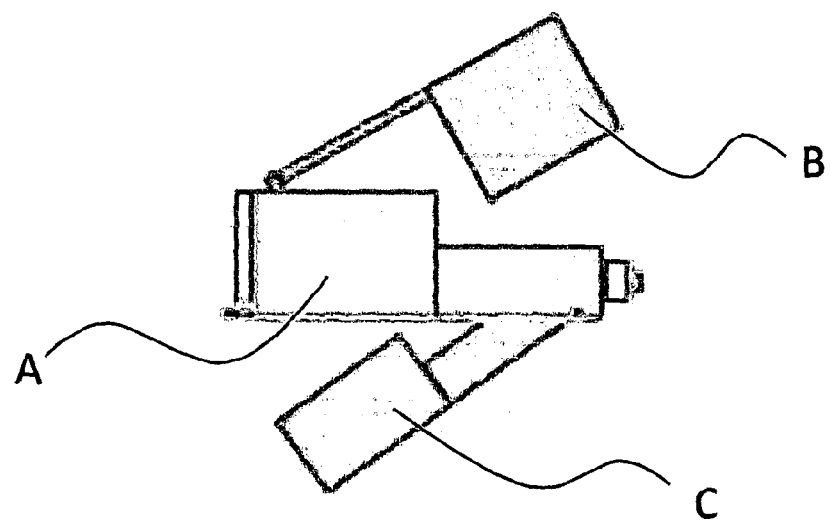
FIG. 1 is a schematic illustration of a prior art valve assembly.
Figure 2:
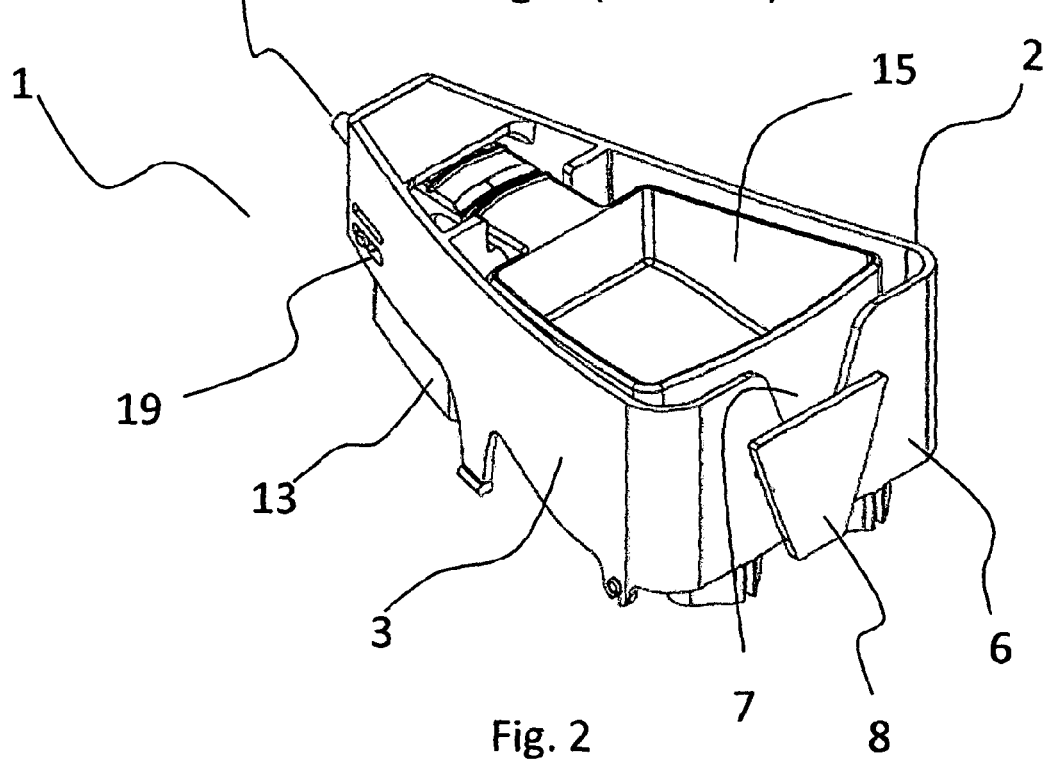
FIG. 2 is a perspective view of a valve assembly constructed in accordance with an embodiment of the present invention.
Figure 3:
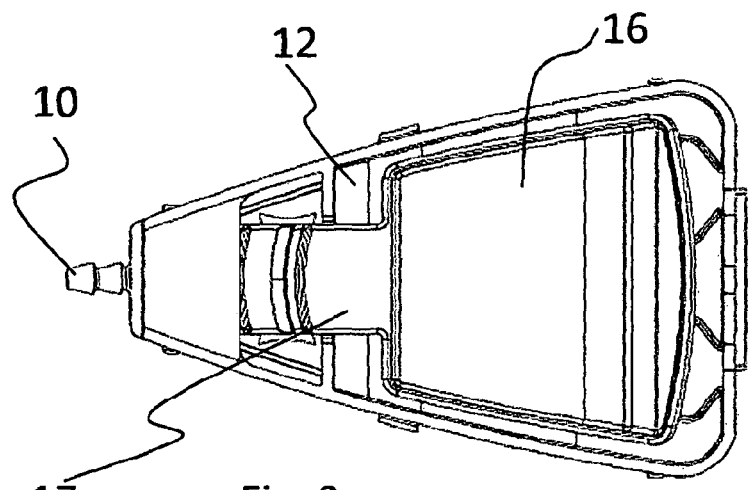
FIG. 3 is a plan view of the valve assembly.
Figure 4:
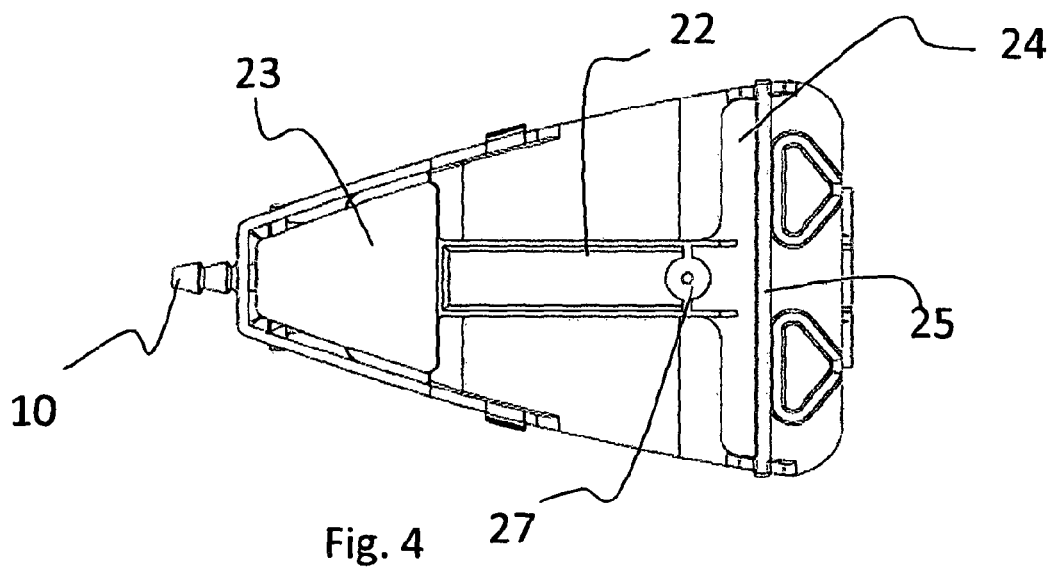
FIG. 4 is a plan view of the valve assembly with the upper float removed.

Referring first to FIGS. 2 and 3, a valve assembly 1 constructed in accordance with the invention comprises a main body 2 having side walls 3 extending upwardly from the edges of a base or floor 4.

Figure 5:
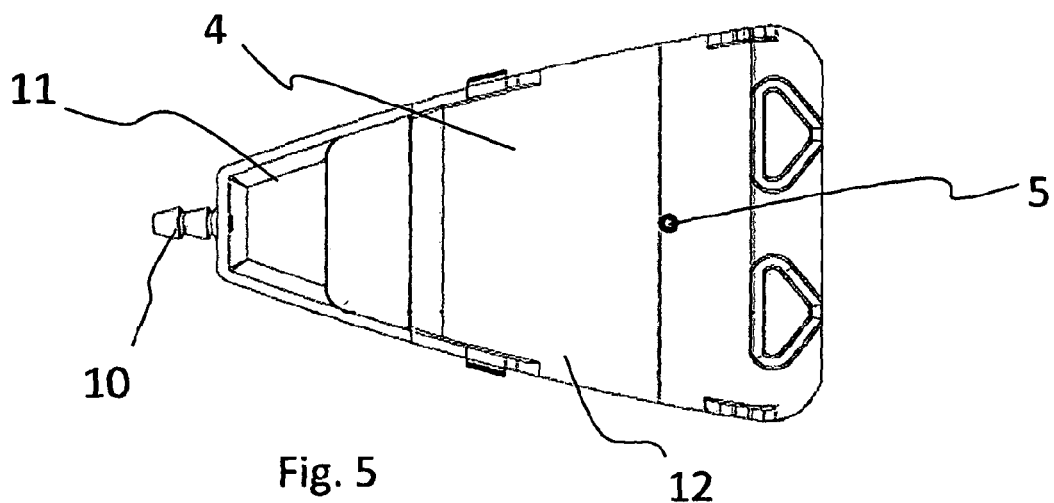
FIG. 5 is a plan view of the main body of the valve assembly.
Figure 6:
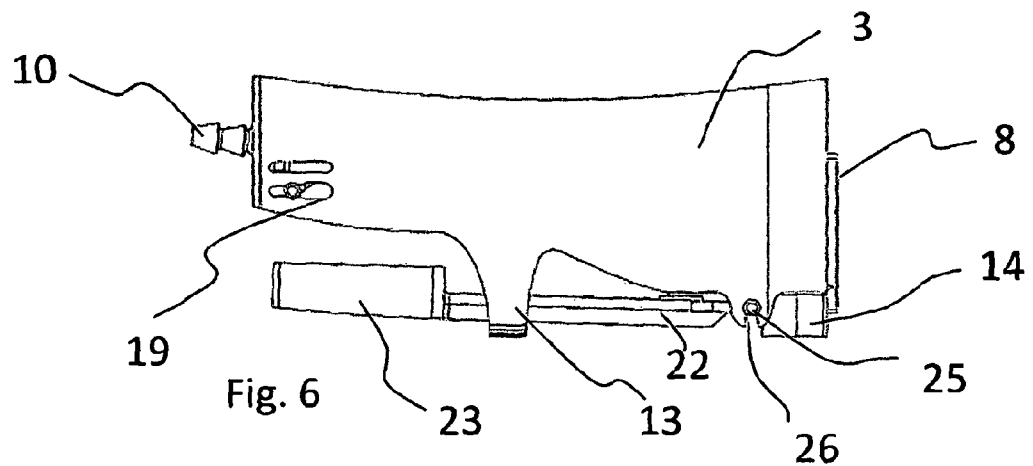
FIG. 6 is side view of the valve assembly.
Figure 7:
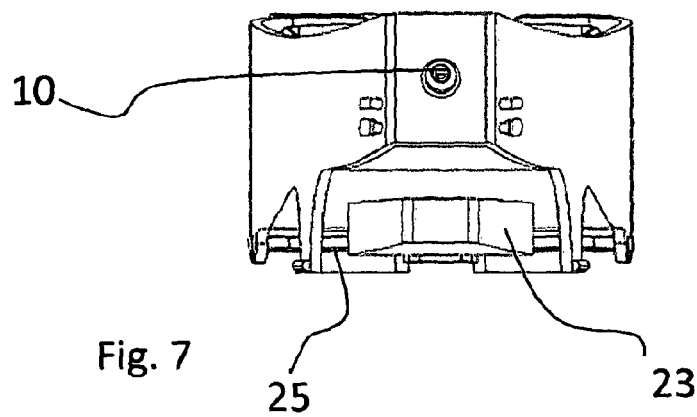
FIG. 7 is an end view of the valve assembly.

As can be seen from FIG. 5, the floor 4 of the main body has an aperture 5 through which water within the main body 2 can drain during use.

A rear wall 6 of the main body 2 has a downwardly extending recess 7. An adjustable back plate 8 is attached to the rear wall 6 and extends across the recess 7 at a pre-determined height. The height that the back plate 8 extends up the recess 7 is adjustable. In use, the adjustability of the back plate 8 allows for a user to set a height, and thus a water level, at which water located outside the valve assembly 1 will flow over the rear wall 6 and into the main body 2.

A front wall 9 of the main body 2 includes an inlet valve 10 which is connected, in use, to the outlet of a water source (not shown) to allow water to flow from the source into the valve assembly 1. The inlet valve 10 is sloped downwardly by approximately 5°.

Figure 8:
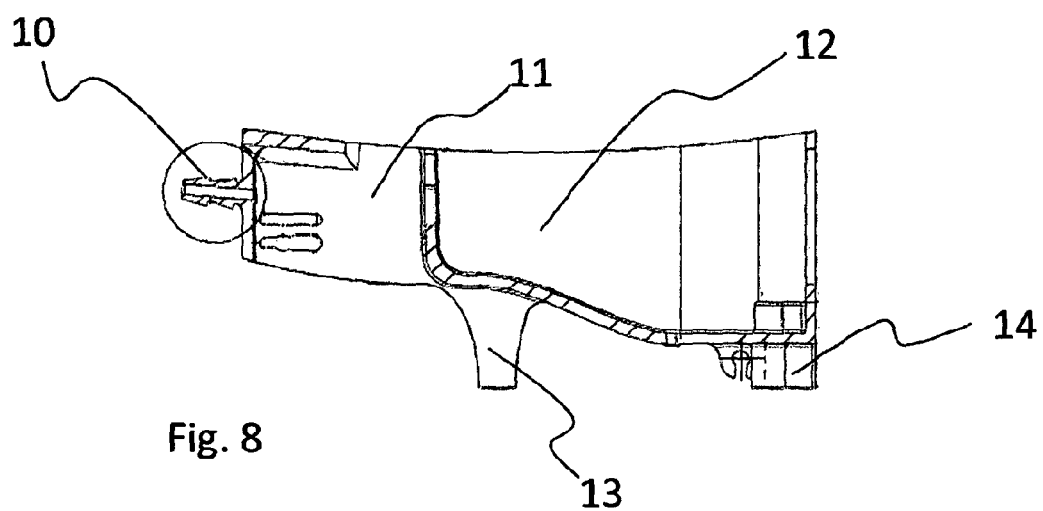
FIG. 8 is a side sectional view of the of the valve assembly.

As can be seen in FIG. 8, the main body 2 includes an outer frame 11 and an inner section 12. The inner section 12 holds water within the assembly 1 during use and includes the floor 5. The outer frame 11 is open to the ground includes at least one downwardly extending leg 13. The inlet valve 10 provides a path of flow of water from the source into the outer frame 11 and into a reservoir in which the valve assembly 1 stands in use. The reservoir will also house the plants and the like requiring irrigation.

The main body 2 has further legs 14 extending downwardly from the other end of the main body 2 to provide stability and balance.

Within the main body 2 is located an upper float assembly 15.

Figure 10:
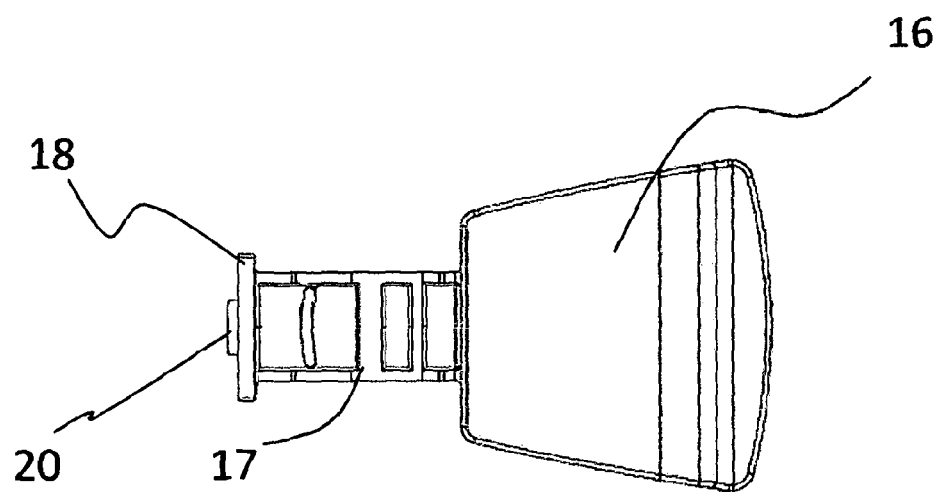
FIG. 10 is a plan view of the upper float of the valve assembly.

As can be seen in FIG. 10, the upper float 15 comprises a main section 16 and an elongate arm 17 which is connected at its distal end to a pivot bar 18 extending transverse to the elongate arm 17. The pivot bar 18 extends within and across the outer frame 11 of the main body 2 with the ends received within apertures 19 formed within outer frame section.

The main section 16 is able to pivot within the main body 2 of valve assembly 1 thereby to float on the surface of water that is located within the main body 2 during use.

The arm 17 includes a silicone plug 20 which acts to seal the inlet valve 10 when the upper float 15 is lifted (by raising of the water level) to a pre-determined height within the main body 2 thereby to shut off the valve 10 and prevent any further ingress of water from the source into the valve assembly 1.

A lower float assembly 21 is pivotally connected to the underside of the main body 2.

Figure 9:
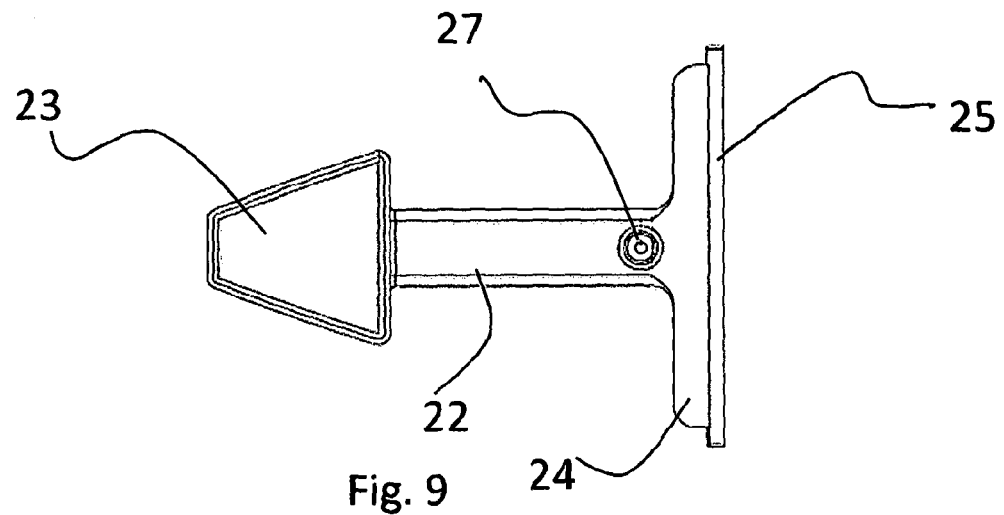
FIG. 9 is a plan view of a lower float of the valve assembly.

As can be seen in FIG. 9, the lower float assembly 21 comprises an elongate arm 22 one end of which is formed as a paddle section 23 and the other of which extends to a transverse arm 24 which includes a pivot bar 25.

The pivot bar 25 extends across the bottom of the main body 2 with the ends received within recesses 26 formed within the sides of bottom section of the body 2.

The elongate arm 22 of the lower float 21 includes a silicon seal 27 facing upwardly therefrom. Pivotal movement of the float 21 in an upward direction causes the seal 27 to abut the underside of the aperture 5 within the main body thereby to seal the aperture 5 to prevent water from draining out of the main body 2.

The working mechanism of the valve assembly will now be described.

The valve assembly 1 is placed within a reservoir for example a tray or pot, which also holds the plants requiring irrigation.

The height of the back plate 8 is set to a pre-determined height equating to the water level requirements for the reservoir.

The inlet valve 10 is connected to the water source to provide a supply of water into the valve assembly 1. Initially the water flows into outer frame 11 of the assembly 1 and out of the bottom of the assembly 1 into the reservoir.

The level of water in the reservoir gradually rises as water flows into it. This water is slowly absorbed by the plant through capillary action that naturally occurs in the growing medium.

Raising of the reservoir water level gradually raises the lower float 21 which pivots about its pivot bar 25 relative to the main body. The float 21 will eventually reach a height wherein the silicon seal 27 abuts against the underside of the aperture 5 in the floor 4 of the main body 2 to close the aperture 5. At this point water in the main body 2 is not able to drain out through the aperture 5. In the meantime, the reservoir water level continues to rise. Once the water level in the reservoir reaches the height of the back plate 8 the water flows over the back plate 8 into the main body 2 thereby filling the main body 2.

Raising of the water level in the main body 2 gradually raises the upper float 15 which pivots about its pivot bar 18 relative to the main body 2.

The silicon plug 20 of the arm 17 of the float 15 eventually raises to a height wherein it seals the inlet valve 10 to prevent any further flow of water from the source into the valve assembly 1.

The water supply remains shut off until the height of the water in the reservoir decreases to a level wherein the lower float 21 pivots downwardly to disengage the seal 27 with the aperture 5 at which point the water contained 20 within the main body 2 is able to drain out through the aperture.

The height of the water within the main body gradually decreases until a level where the upper float 15 pivots downwardly thereby releasing the silicon plug 20 from the inlet 10 to open the valve and introduce water from the source in the valve assembly 1 once again.

It will be understood, that the various embodiments described herein have been described by way of example only and that modifications may be made thereto without departing from the spirit and scope of the present invention as defined in the accompanying claims.

The invention claimed is:

1. A hydroponic valve assembly for free-standing on the floor of a reservoir and controlling the supply of water to the reservoir, the assembly comprising:
   (i) a main body having a floor with an aperture, side walls and at least one downwardly extending leg which, in use, can rest freely on the floor of the reservoir,
   (ii) an upper float located within the main body and pivotally connected thereto, and
   (iii) a lower float located beneath the main body and pivotally connected thereto,
   wherein the upper float is upwardly movable to a position to shut off the water supply to the reservoir, and wherein the lower float is movable upwardly to seal the aperture in the floor of the main body thereby to prevent water draining from the main body through said aperture or from prematurely filling.

2. A hydroponic valve according to claim 1, wherein the main body comprises an inner section and an outer frame and wherein the upper float is located within the inner section.

3. A hydroponic valve according to claim 1, wherein the outer frame includes an inlet for being connected to an outlet of the supply of water to the reservoir.

4. A hydroponic valve according to claim 1, wherein the upper float assembly comprises a main section and an elongate arm the distal end of which is connected to a transverse pivot bar.

5. A hydroponic valve according to claim 4, wherein an end surface of the elongate arm includes a silicon plug which acts to seal an inlet for being connected to an outlet of the supply of water to the reservoir when the elongate arm is pivotally raised relative to the main body.

6. A hydroponic valve according to claim 4, wherein the lower float comprises an elongate arm one end of which is formed as a paddle section and the other of which extends to a transverse arm which includes a pivot bar.

7. A hydroponic valve according to claim 1, wherein a wall of the main body is adjustable in height.

* * * * *